United States Patent Office 3,218,216
Patented Nov. 16, 1965

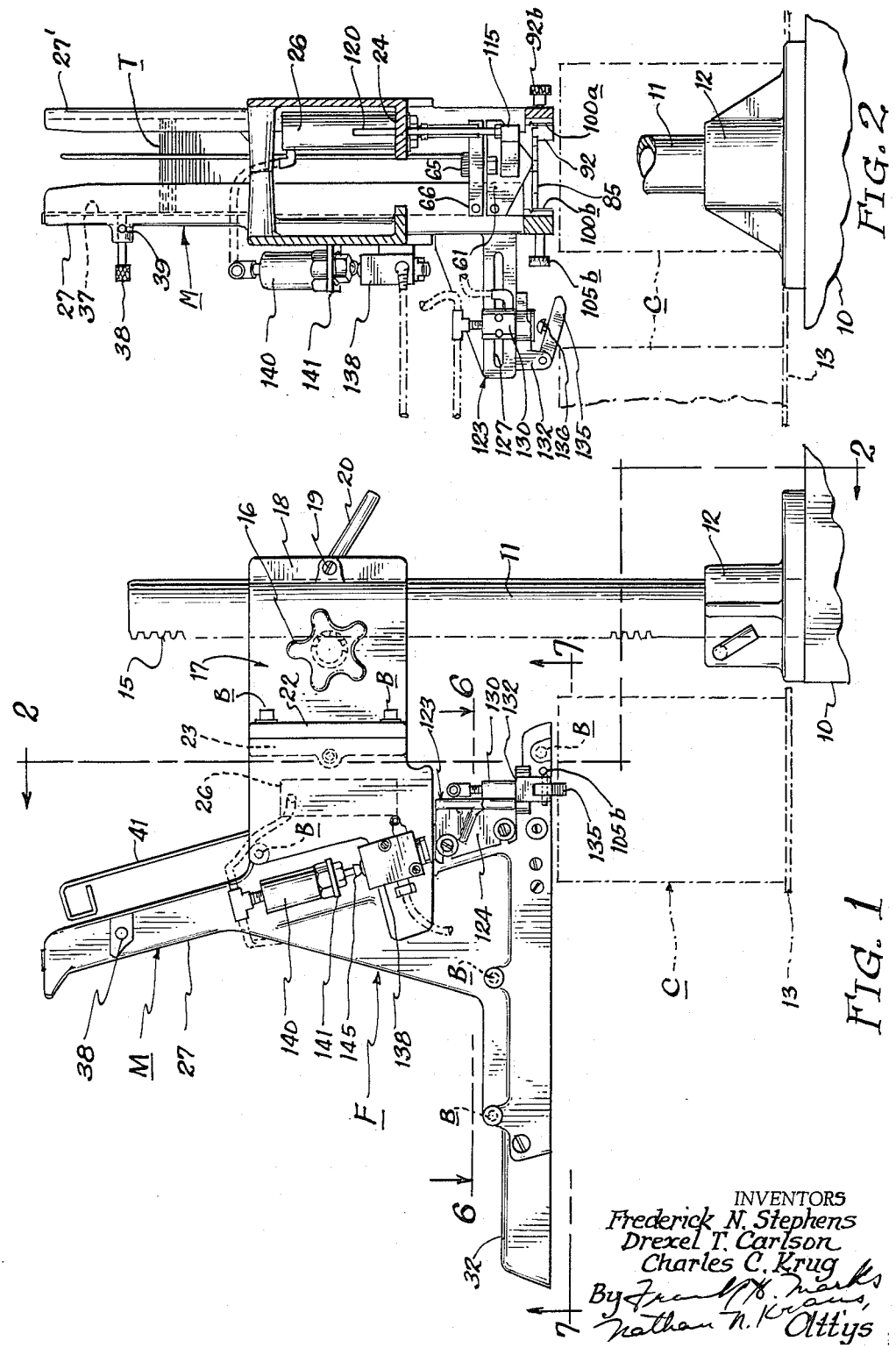

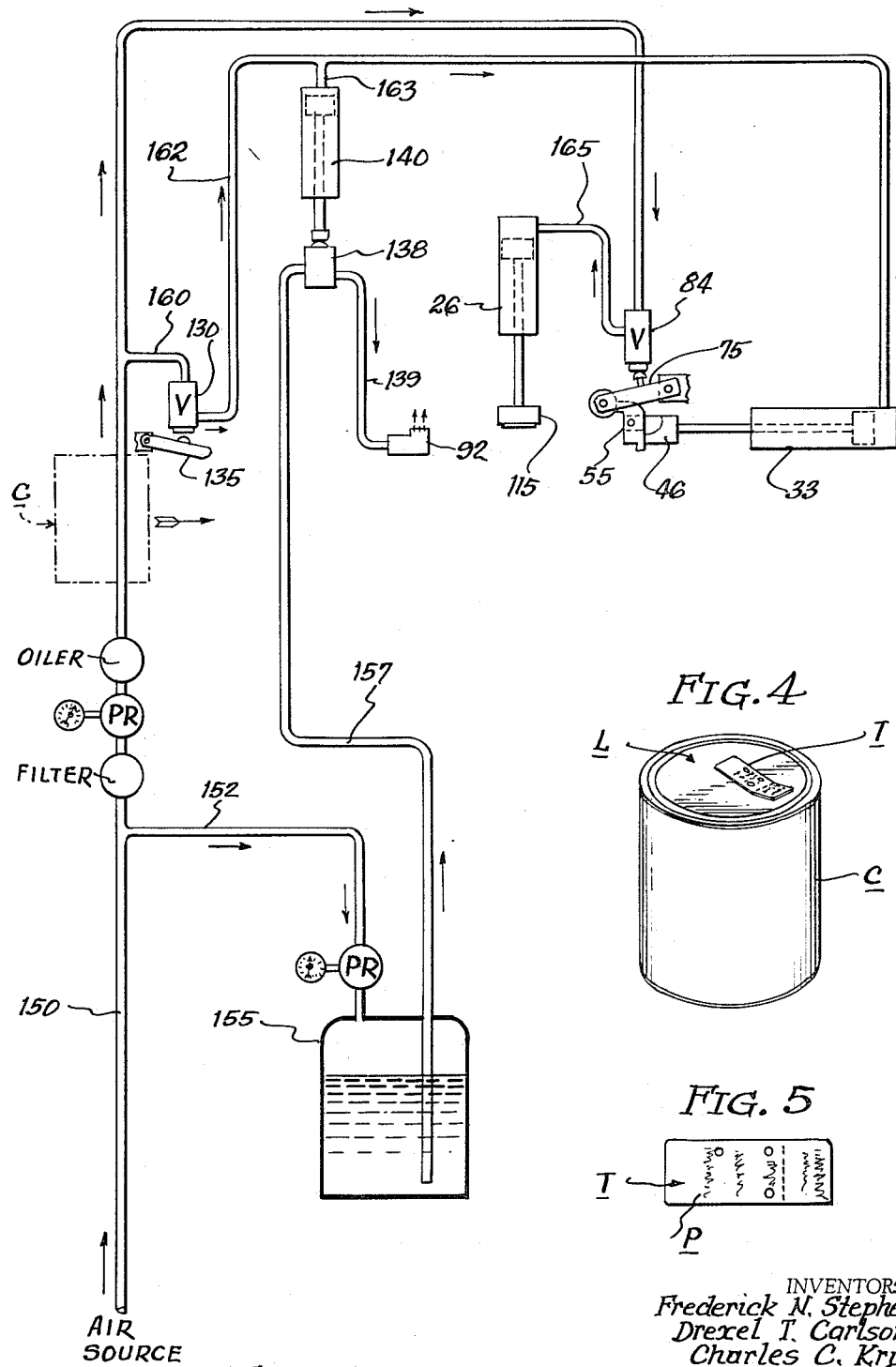

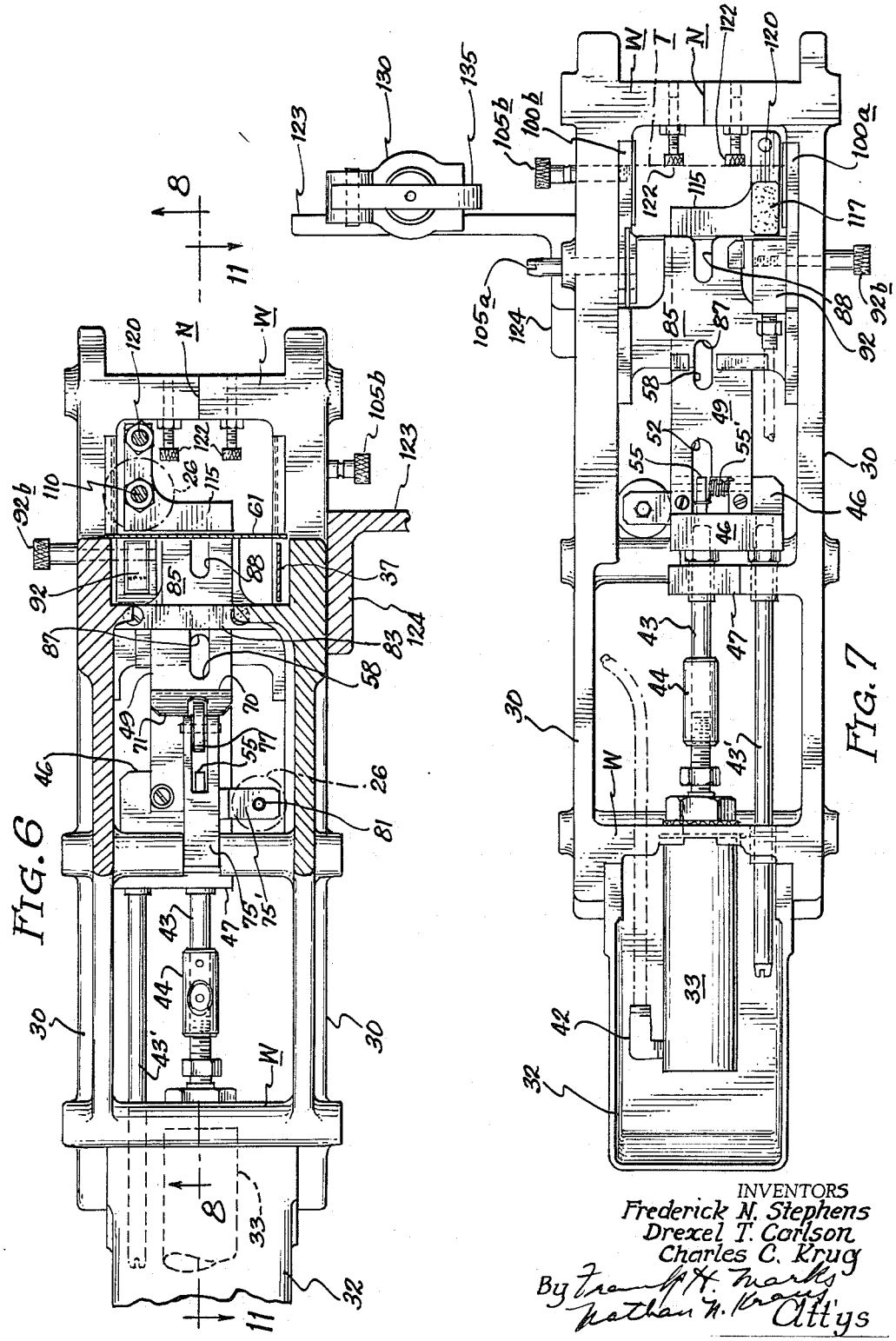

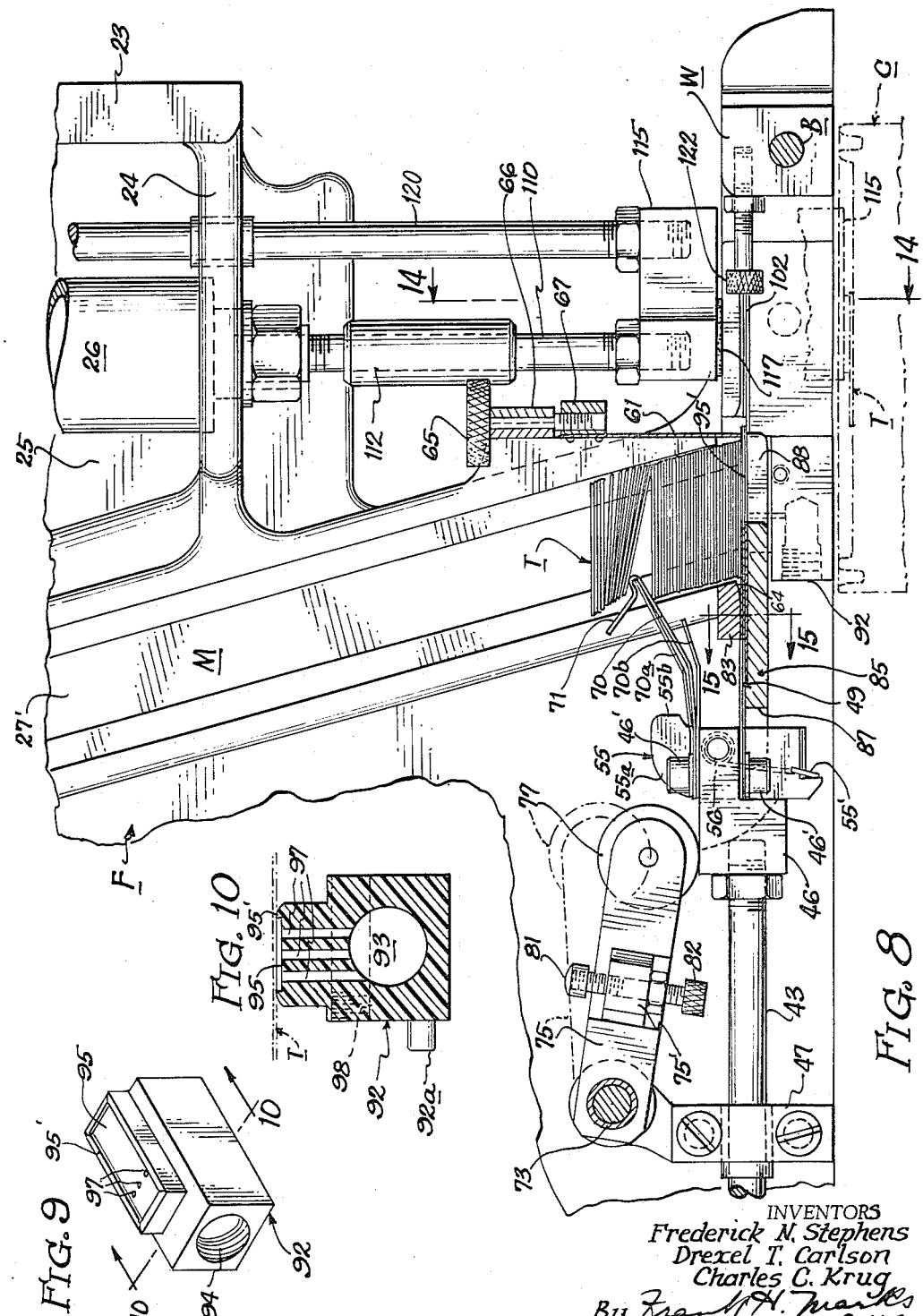

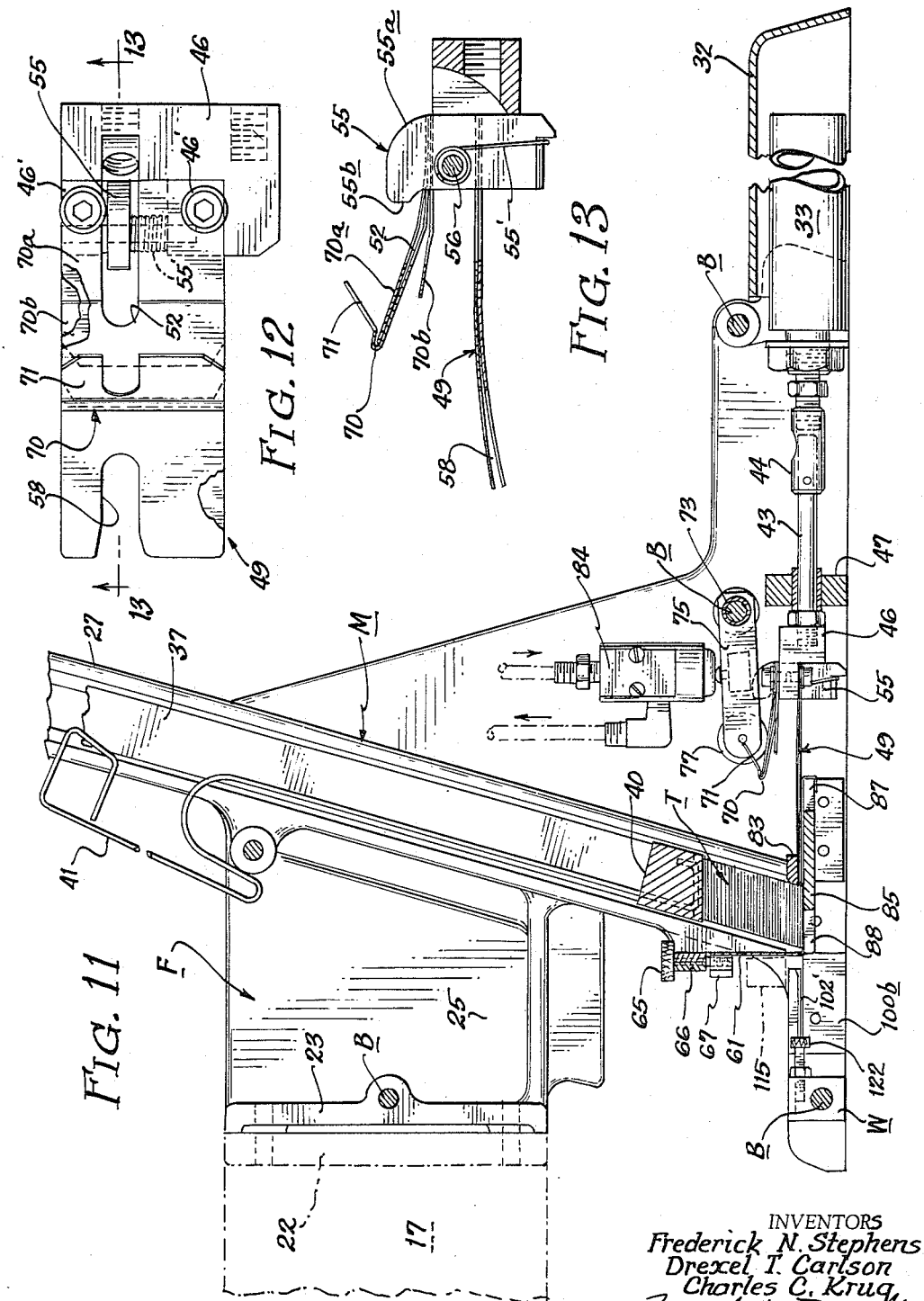

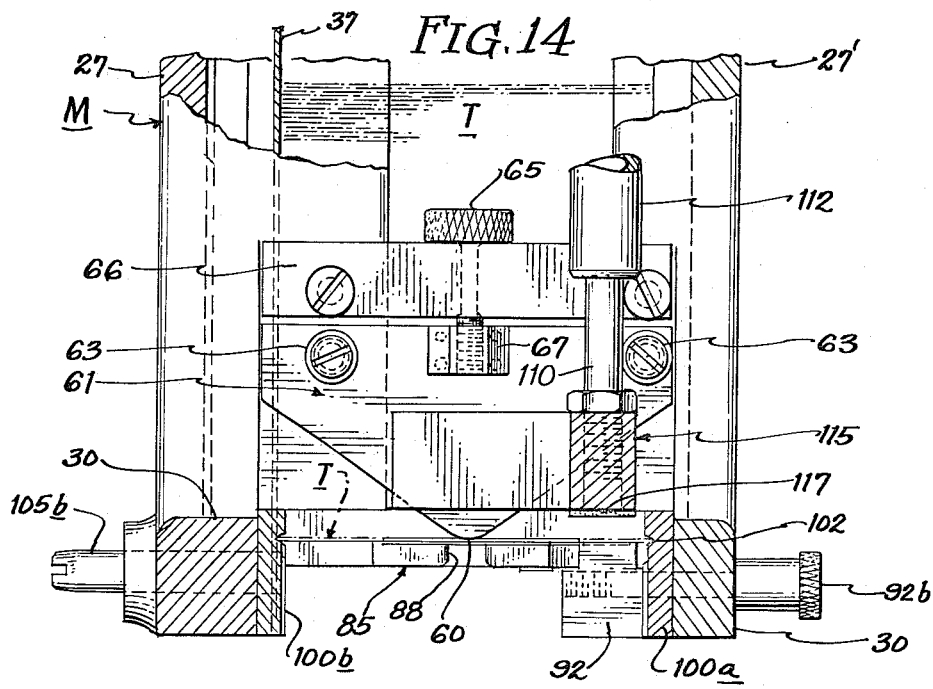
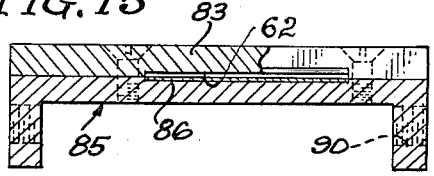
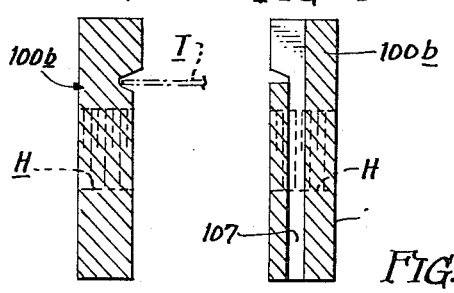
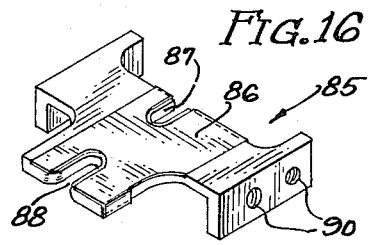
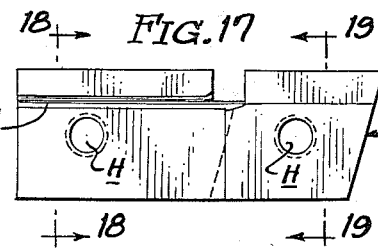
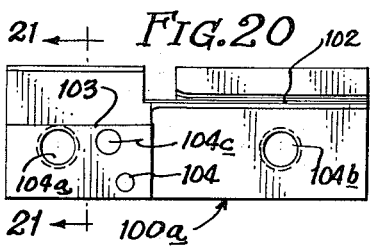

3,218,216
TAG APPLYING MACHINE
Frederick N. Stephens, Leawood, Kans., and Drexel T. Carlson and Charles C. Krug, Kansas City, Mo., assignors to De Soto Chemical Coatings, Inc., Chicago, Ill., a corporation of Delaware
Filed Sept. 26, 1962, Ser. No. 226,245
11 Claims. (Cl. 156—362)

Our invention relates to a machine for applying a tag to an article.

More particularly, our invention contemplates a machine for automatically applying a tag to an article of merchandise as the latter travels past the machine on a continuous conveyor. The article may take a wide variety of shapes, sizes, etc., although we visualize our invention as especially directed to the application of a particular type of tag to a particular type of merchandise.

Our invention is especially concerned with the application of a tag of a character which is in common use in connection with stock-keeping operations in a large business establishment, such as a department store or the like, such tags being usually formed of cardboard or the like and provided with punched holes defining coded symbols for transmitting information to a computer which will automatically "read," classify and store such information. Cards of this character are usually attached at one end to an article of merchandise and are torn off by the salesperson when the article is sold, the tag then being forwarded to an office for appropriate handling as noted above.

In a preferred application of our invention, we have provided apparatus of the character referred to which is automatically actuated and controlled by compressed air. It will be apparent to those skilled in the art, however, that other sources of power might be employed, such as electrical energy with the use of relays, etc., for actuation of the various parts disclosed herebelow.

More specifically, a machine embodying our invention is normally disposed adjacent a conveyor such as a traveling belt or the like carrying in closely juxtaposed relation the articles to be tagged, as for example, immediately after such articles have progressed from packaging or filling apparatus or the like. As one of such articles arrives at the tagging machine embodying our invention, it will actuate sensing means which initiates a series of operations such that, when the article has moved past the sensing means to a second position, a sequence of operations will be completed, resulting in the application to the article of a tag which is adhesively attached thereto. This sequence of operations will be repeated as frequently as the articles continue to move past the sensing means.

While in the embodiment shown the sensing means is physically engaged by the article to be tagged, other means, such as photo-electric, might be used to initiate the operations.

As a special feature of our invention, we provide means in association with tag feeding mechanism for automatically agitating cards at the bottom of a stack, to insure the feeding of a single tag on a stroke and thus avoiding jamming.

Our invention will be more readily understood by reference to the drawings forming a part of this application and illustrating a preferred embodiment of our invention, wherein, FIG. 1 is a side elevational view of a machine constituting a preferred embodiment of our invention, omitting for added clarity, air conduits normally utilized in this embodiment;

FIG. 2 is a sectional-elevational view taken substantially along the line 2—2 of FIG. 1;

FIG. 3 is a schematic air circuit diagram showing certain of the major movable elements of said machine in relation to the compressed air actuating system;

FIG. 4 is a perspective view of a package (cam) to which a tag has been applied by a machine embodying our invention;

FIG. 5 is a plan view of a typical tag of a character which might be employed in the operation of a machine embodying our invention;

FIG. 6 is a plan sectional view taken substantially along the line 6—6 of FIG. 1;

FIG. 7 is a bottom plan view seen from a plane represented by the line 7—7 of FIG. 1;

FIG. 8 is a fragmentary sectional-elevational view taken substantially along the line 8—8 of FIG. 6, on an enlarged scale;

FIG. 9 is a perspective view of an adhesive supply device constituting an element of our invention;

FIG. 10 is a sectional view taken substantially along the line 10—10 of FIG. 9;

FIG. 11 is a fragmentary section-elevation taken substantially along line 11—11 of FIG. 6, substantially similar to FIG. 8 but looking in the opposite direction and with certain movable parts in different position;

FIG. 12 is a detail plan view of tag feeding means constituting an element of our invention, and certain associated parts;

FIG. 13 is a sectional view taken substantially on line 13—13 of FIG. 12, showing the elements in a free state;

FIG. 14 is a fragmentary elevational view, partly in section, taken substantially along the line 14—14 of FIG. 8;

FIG. 15 is a sectional view taken substantially along the line 15—15 of FIG. 8;

FIG. 16 is a perspective view of a sole plate constituting another element of our invention;

FIG. 17 is a side elevational view of an adjustable guide member constituting an element of our invention;

FIG. 18 is a sectional view taken substantially along the line 18—18 of FIG. 17;

FIG. 19 is a sectional view taken substantially along the line 19—19 of FIG. 17;

FIG. 20 is an elevational view of a stationary guide member constituting an element of our invention;

FIG. 21 is a sectional view taken substantially along the line 21—21 of FIG. 20, and FIG. 22 is a top plan view of the element seen in FIGS. 20 and 21.

Referring first to FIGS. 4 and 5, our invention is especially designed to provide an efficient mechanism for the application of a stock-keeping record tag such as tag T to a container C. The tag T may be a standard punched card provided with a transverse row of perforations P spaced a short distance from one end to permit tearing off of the tag when a sale is made, whereby the tag may be processed by suitable apparatus for inventory records or the like.

Although we have shown in FIG. 4 the tag T as applied to a lid L of a metal can C, it will be understood that the mechanism described herebelow and constituting an embodiment of our invention may be used to apply a tag or label to a wide variety of packages or containers or to various other articles.

The mechanism constituting our invention may be conveniently supported from a bench, table or the like indicated at 10 (FIGS. 1 and 2) by means of a post 11 rotatably mounted in a female base member 12, whereby the post with the mechanism supported thereby may be swung in a horizontal plane to position the mechanism over a belt conveyor 13. Rack teeth 15 are provided in post 11 for cooperation with a pinion controlled by a knob 16 whereby the mechanism may be adjusted vertically relative to the conveyor, said pinion being journaled in a bracket 17 which carries said mechanism.

The bracket 17 is bifurcated, having a vertically extending tubular bore receiving post 11 and terminating in end leaves 18; a screw 19 extending through said bifurcations is controlled by a handle 20 (FIG. 1) whereby the bracket may be tightened on post 11 and thus secured at any desired height relative to post 11 and to conveyor 13.

Opposite leaves 18 bracket 17 is provided with a pair of laterally extending flanges 22 abutting against a vertically disposed plate portion 23 forming part of a two-piece frame member F, the bracket 17 being secured to said frame member as by means of bolts B. It will be understood that frame F may be made in two pieces for convenience in casting the same, said parts being more or less symmetrical and joined along a medial vertical plane as indicated by the line N (FIGS. 6 and 7). Although casting of frame F is indicated as a preferred mode of fabrication, obviously other methods might be employed. The two parts of the frame may be secured together at appropriate points by any suitable means such as tie bolts B or the like.

Frame F is so formed as to provide adjacent the wall 23 a space or chamber 25 having a lower ledge or wall 24 supporting an air ram 26 to be hereinafter described (FIG. 8).

Opposite wall 23 and adjacent chamber 25 is an obliquely disposed card magazine M preferably integral with the frame and formed of a pair of opposed channels 27, 27' for engaging the ends of a large number of cards, tags or the like, such as those of the character illustrated in FIG. 5, stacked in superposed relation (FIG. 8). As seen in FIGS. 1 and 11, the magazine extends above and below bracket 17. It will be noted (FIG. 2) that the two sides 27, 27' of magazine M are both channel shaped, side member 27 being somewhat deeper than side 27'.

Also integral with frame F and disposed below the magazine M is a pair of spaced parallel and horizontally aligned arms 30, 30, said arms extending forwardly and rearwardly of the magazine and secured together as by means of tie bolts B or the like extending through cross bars W (FIGS. 6, 7 and 11).

Seated within channel 27 is a movable wall member 37 which may be adjusted inwardly and outwardly for accommodating cards of different lengths by means of a detent pin 38 which in turn may be locked by a spring loaded ball screw 39. (The bottom part of wall 37 is similarly adjustable by means described herebelow.) Freely slideable up and down within the magazine is a block 40 of metal or the like attached to a wire manipulating bail 41 (FIG. 11). Block 40 serves as a weight normally resting upon and holding down a stack of tags T within the magazine. Bail 41 has an S-shaped top portion extending out of the magazine, serving as an indicator of the depth of the stock of tags within the magazine.

Secured to arms 30, 30, opposite bracket 17 is a shell-like housing 32 which is open at the bottom and forward end thereof and covers an air cylinder or ram 33 for actuating a feed shuttle as described below.

Air ram 33 (FIGS. 6, 7, 12 and 13) is fitted with a nipple 42 for the introduction of air into the cylinder. Inasmuch as this ram, and others like it incorporated in the mechanism here described, are of substantially standard mechanical construction and operation, they will not be shown or described in detail; suffice it to say that these devices are simple spring loaded air pistons employed by us for providing linear motion, and that a variety of other mechanical or electrical expedients might be used for the same purpose and with equal effect in connection with our invention without departing from the spirit thereof.

Actuated by ram 33 through a drive rod 43, including threaded adjusting sleeve 44, is a horizontally reciprocable shuttle block 46. Rod 43 passes through a guide bar 47 fixed to the frame, and also attached to shuttle block 46 is an aligning rod 43' which likewise slides through bar 47.

Secured to shuttle block 46 as by screws 46' (FIGS. 12 and 13) is tag feed member or shuttle 49, preferably consisting of a superposed pair of resilient spring-steel plates which together are approximately of the same thickness as that of a tag T which this shuttle is intended to engage edgewise and project forwardly on a thrust of said tag feed member 49 by ram 33 acting through rod 43 and shuttle block 46. The plates of tag feed member 49 are slotted as at 52 to permit passage of an actuating cam 55 which will be described further herebelow, said cam being pivotally mounted on shuttle block 46 as by a bearing pin 56. The cam (FIG. 13) has a sloping face 55a and a vertical face 55b.

Tag feed shuttle 49 is provided at its forward end (FIG. 12) with a slot 58. A gate member 61 in the form of a metal plate is secured to the frame as by screws 63. These screws extend through oversized holes in gate 61 whereby the gate may be adjusted within narrow limits in a vertical plane by means of a knurled-headed screw 65 extending through bar 66 attached to the frame. Thus, as shown in FIG. 14, tongue 60 at the bottom of feed gate 61 extends close to the upper surface of tag feed shuttle 49 to insure that only a single tag T will be fed on a forward thrust of the shuttle, gate 61 being adjustable vertically by screw 65 to accommodate tags of various thickness.

Also secured to shuttle block 46 by screws 46' is an agitator 70, seen best in FIGS. 8, 12 and 13. This element is preferably formed of a piece of resilient spring steel extending forwardly from the shuttle block in superposed relation to feed shuttle 49, with leaf springs 70a and 70b disposed above and below said agitator for limiting up and down movement of the latter. The agitator extends forwardly and upwardly from its line of attachment and has a terminal portion 71 bent in V formation backwardly and upwardly from the blunt forward extremity thereof (FIG. 13). Agitator 70 is so designed that, as it is thrust forward along with the shuttle, said agitator provides an upward, lifting and ruffling action against the uppermost tags, while it simultaneously provides a downward and compressing action on the lowermost tags at the bottom of the stack in magazine M, thus aligning the tags for proper feeding and to avoid the missing or jamming of a tag in "ready" position by feed shuttle 49.

Pivotally mounted on the frame, as on a bushing 73, is an actuator arm 75 (FIG. 11) having journalled at its opposite end a roller 77, said roller being in a position to engage the upper extremity of cam 55. Extending transversely of arm 75 is a lateral extension 75' (FIG. 8) carrying an upwardly extending finger 81 which is adjustable in height by means of a screw 82 extending through extension 75' from the bottom thereof. Finger 81 is in a position to engage and actuate an air control valve 84 for controlling the supply of compressed air to the mechanism (FIGS. 6 and 11), as hereinafter described.

It should be noted that on the forward movement of shuttle block 46 carrying cam 55, the cam 55 will slide under roller 77, the cam being rotated by said roller approximately 90° on its axis 56 and thereafter being snapped back by the cam return spring 55' to its normal position, as seen in FIG. 13. On the return or backward movement of the shuttle block the projecting curved face 55a of cam 55 will react against roller 77, rocking arm 75 upwardly on its pivot and thus reacting finger 81 against air control valve 84 (FIG. 11) for purposes described herebelow.

Feed shuttle 49 rides on an underlying rigid sole plate 85, seen in perspective in FIG. 16. This element may conveniently be an aluminum casting generally of channel formation reinforced by a hard steel wear plate 86 on the upper surface thereof for direct contact with shuttle 49, and has a slot 87 in the rear thereof to accommodate cam member 55 and another slot 88 in the forward portion to match slot 58 in shuttle 49 for manual access in lifting tags in the magazine when desired. Sole plate 85 is provided with transverse threaded apertures 90 whereby it may be secured to the frame by means of screws or the like.

Also carried on the frame adjacent sole plate 85 is an adhesive feed applicator 92 (FIGS. 7, 9 and 10). This element may conveniently be formed of a suitable non-corroisve material such as stainless steel, plastic resin, etc., and is provided with a cavity 93 extending longitudinally of the applicator, said cavity having a screw threaded opening 94 in one end thereof and being closed at its opposite end. Formed integrally on the top of applicator 92 and extending longitudinally on the upper portion thereof, is a trough portion 95, a plurality of relatively small ducts 97 serving as adhesive conduits from chamber 93 to trough 95. A threaded socket 98 may be provided for screw attachment of the adhesive applicator to the frame, while a poistioning stud 92a attached to and extending from the side of the applicator fits into a socket in the frame.

It will be noted that adhesive applicator 92 is positioned on the frame adjacent an extreme marginal portion of sole plate 85 and at such a level (FIG. 2) that the upper surface 95' of walls forming trough 95 will be engaged by the lowermost tag in the magazine M and wiped by the tag as it is projected across the sole plate, so that liquid adhesive will be applied to the underside of an extreme end portion of such a tag.

Extending over and secured to sole plate 85 as by screws is a transverse bar 83 attached to the frame and recessed on its under surface to provide a channel 62 for the passage of tag feed shuttle 49 (FIGS. 8 and 15), said channel being bevelled at its forward edge as at 64 as seen best in FIG. 8.

Secured to the forward portions of arms 30, 30 of frame F directly in advance of sole plate 85 is a pair of guide plates 100a and 100b, as depicted in FIGS. 14 and 17–22, inclusive. Looking first at FIGS. 20 and 21, it will be noted that the stationary tag guide plate 100a is secured to the frame as by means of tie bolts or screws and is provided with a groove 102 adapted to receive a side edge of a tag T. Disposed on stationary tag guide plate 100a and rearwardly of groove 102 is an outwardly projecting ledge 103 for mounting and spacing adhesive applicator 92, a cavity 104 being provided therein to receive stud 92a (FIG. 10) of the adhesive applicator to locate the same. Stationary tag guide plate 100a is also provided with threaded holes 104a and 104b for receiving screws for attaching the bar to the frame and another hole 104c to receive a screw for securing the adhesive applicator.

Opposite stationary tag guide plate 100a on the inside of the opposite arm of the frame 30 is attached a transversely adjustable tag guide plate 100b, as shown in FIGS. 17, 18, 19 and 22. This tag guide plate likewise is grooved as at 102' similar to groove 102 of stationary tag guide plate 100a, for receiving the opposite side edge of a tag T. As seen in FIG. 17 movable tag guide plate 100b is provided with a pair of tapped holes H to which are threadedly secured rods 105a and 105b (FIG. 7) which slideably extend through an arm 30 of the frame, one of said rods 105b having a knurled manipulating head, as seen in FIG. 7. A vertical slot 107 (FIGS. 19 and 22) extends through one end of moveable tag guide plate 100b for receiving an end of the adjustable wall 37 of tag magazine 27, 27' (FIGS. 3, 11 and 14). Thus, in the operation of adjusting moveable tag guide plate 100b by means of its knurled rod 105b to accommodate a tag of a certain width, it will be seem (FIG. 14) that simultaneously the lower portion of moveable wall member 37 will correspondingly be adjusted. The upper end of said movable wall member 37 will be adjusted by its knurled bolt 38 to correspond with the lower adjustment just described. (FIG. 3.)

As noted above, an air ram 26 is supported by horizontal ledge 24 of frame F within chamber 25 of the frame. Looking at FIG. 8 it will be noted that ram 26 is connected to a rod 110 through an adjustable connector sleeve 112, said rod being threadedly connected to an L-shaped tag-applying head 115 positioned forwardly of gate 61 (FIG. 8). Head 115 has adhesively secured to the lower face thereof a relatively narrow rectangular contact strip 117 of synthetic plastic material or the like of approximately the size and shape of the end area of a tag T which is to be adhesively applied to an article, said strip 117 having some resilience and having relatively high wear resistance. Slidably passing through ledge 24 is a guide rod 120, said rod also being threadedly attached to head 115 for maintaining the latter in proper position.

Threaded into transverse cross bar W at the forward end of the frame is a pair of screw members 122 having knurled heads serving as adjustable bumpers or stops for limiting the forward movement of a tag T in the feeding operation. (FIGS. 7 and 8.)

Attached to frame F adjacent gate 61 and extending laterally therefrom is a L-shaped bracket or arm 123, said bracket having an attachment flange 124 which is slotted to receive screws, whereby the bracket may be adjustably mounted longitudinally of the frame (FIGS. 1 and 2). This bracket has a longitudinal slot 127 to adjustably seat air valve 130. Attached to said air valve 130 and embracing the latter is a bifurcated bracket 132 which pivotally carries an article-sensing trigger 135 having an upwardly extending stud 136 (FIG. 2) for engagement with the air valve 130 when the sensing finger 135 is wiped from below by an article C traveling along conveyor 13 to the right, as seen in FIG. 2.

Also mounted on frame F (FIGS. 1 and 2) is an adhesive control valve 138, which may be of more or less standard design and controlled by an air cylinder or ram 140 mounted on the frame directly above said valve on a suitable bracket 141 projecting laterally from tag magazine M, said ram 140 having a piston rod 145 for actuating valve 138.

As stated above, the embodiment of our invention illustrated and described herein is especially designed for operation by compressed air, although other sources of power might be applied to the mechanism without departing from the spirit of our invention. Accordingly, we will now proceed to a description of the power transmission to the various parts of the mechanism in this embodiment as schematically illustrated in FIG. 3.

A source of compressed air (not shown), such as a compressor, supplies compressed air through a conduit 150, a portion of which is directed through a branch line 152 to a reservoir 155 for liquid glue. Said adhesive, which should be of a character, such as fluidity, drying time, etc., to meet the requirements of our mechanism, is conveyed out of said reservoir 155 through a discharge conduit 157 to valve 138, referred to above, and from said valve, through conduit 139, to adhesive applicator 92, also described above. It will be understood that the supply of adhesive to adhesive applicator 92 must be controlled in order to prevent flooding of said applicator, and valve 138 is accordingly provided for this purpose, said valve being actuated, as described above, by air ram 140. It will be understood that valve 138 as well as the several air rams employed in this embodiment of our invention may be of standard construction. Valves 138 and 84 are spring-loaded for automatic return while valve 130 is similar but with the spring removed.

Returning to air conduit 150, it will be noted that compressed air, after passing through a suitable filter, oiler and pressure regulator, is fed through a branch conduit 160 to valve 130 which is actuated by sensing element or trigger 135, the air which is discharged from valve 130 passing through conduit 162 and a bypass 163 to ram 140 for actuating valve 138 controlling the supply of adhesive to applicator 92. Conduit 162 further conducts compressed air to ram 33 which actuates shuttle block 46. The latter, in turn, through cam 55 and rocker arm 75 actuates air valve 84. Valve 84, when so actuated, feeds air through conduit 165 to ram 26 which actuates tag applicator or head 115.

The sequence of operations will be substantially as follows: As an article C resting on the conveyor is moved to sensing member 135, the latter will be reacted upon by said article, opening valve 130. It will be noted that sensing member 135 will maintain valve 130 in open position so long as said member continues to ride the top of an article C. Valve 130 will feed compressed air through conduit 162 to shuttle ram 33 which will thus be moved forwardly, feeding a single tag from the reservoir to a position underlying tag applying ram 26. It will be recalled, as pointed out above, that in the forward movement of the feed shuttle a plurality of the lowermost tags in the stack will be agitated or joggled as an incident to the feeding movement. At the same time, air will be fed through the same conduit 162 to ram 140, controlling the flow of adhesive through valve 138 from adhesive reservoir 155 to adhesive applicator head 92.

When sensing member 135 drops off the trailing edge of an article C, valve 130 will automatically close by air pressure. Tag feed shuttle ram 33, being spring-loaded, will be retracted and, as an incident to the rearward movement thereof, cam 55, acting through arm 75, will react upon air control valve 84 momentarily. This action motivates ram 26, causing it to move downwardly and, through head 115, to act upon an underlying tag which has just been advanced by shuttle ram 33 and apply it to the top surface of an article C which is in position underlying head 115. Simultaneously with the latter action, adhesive control valve 138 will be momentarily opened through ram 140 and a shot of adhesive will be fed through the valve to adhesive applicator 92.

Upon completion of the sequence of operations just described, the mechanism is ready for another operation, and the process will be repeated as quickly as articles C are moved to and past sensing element 135.

It will be noted that the mechanism described above is quite flexible, being adjustable for articles of different height and width by reason of the adjustability of the positioning of the sensing element through its supporting means, as well as by the adjustability of frame F as a whole relative to its supporting post 11. Furthermore, as described above, the device is adjustable within wide limits for tags or cards of various widths, lengths and thickness.

The adhesive applicator can be easily removed, by reason of its simple mounting on the frame, for complete cleansing if desired. Any of the other parts, likewise, are readily accessible for removal, repair or adjustment if required.

The device is efficient, rapid and economical. Once adjusted for a given operation, it will operate automatically for long periods without human supervision.

Various changes coming within the spirit of our invention may suggest themselves to those skilled in the art; hence, we do not wish to be limited to the specific embodiment shown and described or uses mentioned, but intend the same to be merely exemplary, the scope of our invention being limited only by the appended claims.

Although our invention, as described, includes adhesive applying means, the latter might be separate from our improved mechanism. Thus, adhesive might be applied to an area of an article before reaching the sensing means, in which case the tag will be attached to said adhesive area by our mechanism.

We claim:

1. Mechanism of the class described for applying tags sequentially to a series of articles as they are moved into proximity to said mechanism, comprising (a) a magazine for housing a stack of tags in superposed relation,
(b) means for intermittently feeding the lowermost one of said tags in a generally horizontal plane to a position spaced from said magazine,
(c) tag-applying means disposed adjacent the magazine above the plane of the lowermost tag therein and adapted to move the tag so fed and disposed below said applying means onto one of said articles,
(d) sensing means positioned to be actuated by one of said articles when the latter is moved into proximity thereto,
(e) means controlled by said sensing means for sequentially actuating, first, said feeding means, and, shortly thereafter, said tag-applying means,
(f) means for providing a supply of compressed air to said mechanism, including
(g) valve means controlled by said sensing means, and
(h) air rams controlled by said valve means for actuating said tag-feeding means and said tag-applying means, respectively.

2. Mechanism of the class described for applying tags sequentially to a series of articles as they are moved into proximity to said mechanism, comprising (a) a magazine for housing a stack of tags in superposed relation,
(b) means for intermittently feeding the lowermost one of said tags in a generally horizontal plane to a position spaced from said magazine,
(c) tag-applying means disposed adjacent the magazine above the plane of the lowermost tag therein and adapted to move the tag so fed and disposed below said applying means onto one of said articles,
(d) sensing means positioned to be actuated by one of said articles when the latter is moved into proximity thereto,
(e) means controlled by said sensing means for sequentially actuating, first, said feeding means, and, shortly thereafter, said tag-applying means, and
(f) means carried by said tag-feeding means for mechanically agitating a plurality of the lowermost tags in said stack as an incident to each feeding movement.

3. A combination as in claim 2, wherein said agitating means comprises resilient means imparting substantially concurrent upward lifting and ruffling action on a plurality of tags in the stack and a downward compressing action on a plurality of tags therebelow.

4. A combination as in claim 2, wherein
(a) said tag magazine has a discharge outlet and
(b) the tag-feeding means comprises a resilient generally planar tag pusher,
(c) guide means for retaining said pusher substantially in the plane of the tag to be fed, and
(d) relatively stationary gate means adjacent said tag magazine for restricting the effective opening of said discharge outlet to a thickness not substantially greater than that of a single tag.

5. A combination as in claim 4, having a bed plate associated with said pusher and gate means, said plate having an aperture therein receiving a portion of said gate means for restricting the feed to a single tag.

6. Mechanism of the class described for applying tags sequentially to a series of articles as they are moved into proximity to said mechanism, comprising (a) a magazine for housing a stack of tags in superposed relation,
(b) means for intermittently feeding the lowermost one of said tags in a generally horizontal plane to a position spaced from said magazine, said feeding means comprising a pusher engageable with the trailing edge of said lowermost tag,
(c) tag-applying means disposed adjacent the magazine and above the lowermost tag therein and adapted for substantially straight-line reciprocal plunging movement into engagement with the tag so fed, so as to project it downwardly onto one of said articles, (d) sensing means positioned to be actuated by one of said articles when the latter is moved into proximity thereto, and (e) means controlled by said sensing means for sequentially actuating, first, said feeding means, and, shortly thereafter, said tag-applying means.

7. A combination as in claim 6, wherein the feeding means and tag-applying means comprise reciprocal plungers.

8. A combination as in claim 7, including
(a) means fixedly positioned adjacent said magazine for applying adhesive to a lower portion of the tag being fed, and
(b) plunger means for supplying a charge of adhesive to said adhesive-applying means concurrently with each tag-feeding operation.

9. A combination as in claim 8, wherein the sensing means, when actuated by an article, actuates said adhesive-supply plunger and said card-feeding plunger, and said tag-applying plunger is thereafter actuated by said card-feeding plunger on its return stroke.

10. In a combination as in claim 9,
(a) a source of compressed air for actuating all of said movable parts,
(b) a master air valve opened by said sensing means upon actuation of the latter by one of said articles,
(c) the adhesive-supply plunger and tag-feed plunger comprising air rams reacting directly upon opening of said master air valve,
(d) the tag-applying plunger also comprising an air ram,
(e) a valve controlling said tag-applying ram, and
(f) cam means carried by the tag-feed ram and acting on said tag-applying ram valve on the return stroke of said tag-feed ram.

11. A combination as in claim 10, wherein said rams are spring loaded to motivate an automatic return stroke of said rams.

References Cited by the Examiner
UNITED STATES PATENTS

| | | | |
|---|---|---|---|
| 2,391,694 | 12/1945 | Everett | 156—364 |
| 2,939,599 | 6/1960 | Schluter | 156—364 |
| 3,039,516 | 6/1962 | Vinal | 156—556 |

EARL M. BERGERT, *Primary Examiner.*

HAROLD ANSHER, *Examiner.*